US009535816B2

(12) United States Patent
Young et al.

(10) Patent No.: US 9,535,816 B2
(45) Date of Patent: Jan. 3, 2017

(54) REMOTE DIAGNOSTICS FOR A COMPUTING DEVICE

(71) Applicant: LENOVO (Singapore) PTE, LTD., New Tech Park (SG)

(72) Inventors: Bryan L. Young, Apex, NC (US); Nathan J. Peterson, Durham, NC (US); Marc Richard Pamley, Durham, NC (US)

(73) Assignee: Lenovo (Singapore), New Tech Park (SG)

( * ) Notice: Subject to any disclaimer, the term of this patent is extended or adjusted under 35 U.S.C. 154(b) by 149 days.

(21) Appl. No.: 14/144,157

(22) Filed: Dec. 30, 2013

(65) Prior Publication Data

US 2015/0186233 A1    Jul. 2, 2015

(51) Int. Cl.
    *G06F 11/00*    (2006.01)
    *G06F 11/36*    (2006.01)
(52) U.S. Cl.
    CPC ................... *G06F 11/366* (2013.01)

(58) Field of Classification Search
    USPC ......................................................... 714/36
    See application file for complete search history.

(56) References Cited

U.S. PATENT DOCUMENTS

| | | | |
|---|---|---|---|
| 6,148,417 A * | 11/2000 | da Silva ........................ 714/25 |
| 2005/0015668 A1 * | 1/2005 | Doyle et al. .................. 714/25 |
| 2007/0168425 A1 * | 7/2007 | Morotomi ..................... 709/204 |
| 2010/0042868 A1 * | 2/2010 | Apelbaum et al. ............... 714/2 |
| 2010/0223504 A1 * | 9/2010 | DeHaan et al. ................ 714/37 |
| 2011/0178987 A1 * | 7/2011 | Choi .............................. 707/646 |
| 2013/0275492 A1 * | 10/2013 | Kaufman et al. ............ 709/203 |
| 2014/0115382 A1 * | 4/2014 | Sainath ........................ 714/6.11 |
| 2014/0201571 A1 * | 7/2014 | Hosek et al. .................. 714/26 |
| 2015/0171930 A1 * | 6/2015 | Joehren ........................ 455/41.1 |

\* cited by examiner

*Primary Examiner* — Sarai Butler
(74) *Attorney, Agent, or Firm* — Kunzler Law Group

(57) ABSTRACT

For remote diagnostics of a computing device, a method is disclosed that includes collecting failure information from a computing device, wherein the computing device has an error, encapsulating the failure information into a file, and transmitting the file from the computing device to a remote device using a low level file transfer protocol.

20 Claims, 7 Drawing Sheets

400

402 → {
    "display": "onBoard nVidia",
    "memory": "8 Gibibytes",
404 → "storage": 256,
    "processor": {
        "make": "Intel",
        "model": "E8800",
        "temperature": "95",
        "cores": 4
    },
                                    ← 444
440 → "peripherals": [
        {
            "type": "keyboard",
            "make": "Microsoft"
        },
        {
            "type": "mouse",
            "make": "Logitech"
        }
    ]
406 → }

FIG. 4

REMOTE DIAGNOSTICS FOR A COMPUTING DEVICE

FIELD

The subject matter disclosed herein relates to computing devices and more particularly relates to remote diagnostics for a computing device.

BACKGROUND

Description of the Related Art

Computing devices fail, experience errors and/or fail to function properly for a variety of reasons. Various failures may be difficult to troubleshoot because a computing device, due to the failure, may not be able to communicate the error to inform a user as to the nature of the problem. In some examples, error messages may be transmitted or displayed to a user, however, this information typically comes in a cryptic format that may be difficult for a user to understand. For example, in some devices, an error code may be beeped through a speaker of the system. In this example, a user would have to look up the beep code in a manual. In other examples, LED's may be used to display an error code, or other limited information. Still, a user typically must look up the error code in order to determine the nature of the problem.

Furthermore, beeped errors, or LED displays can typically only identify a predetermined set of errors. User may look up the errors in a manual, but are frequently instructed to contact a technical support specialist for further assistance. Decoding error codes, and communicating with a remote technical support person may be very frustrating for a user. The remote technical support person still must rely on the perceptions and diagnostic abilities of the user physically located at the computing device.

BRIEF SUMMARY

An apparatus for remote diagnostics of a computing device is disclosed. A method and computer program product also perform the functions of the apparatus. In one embodiment, the apparatus includes an information module that collects failure information from the apparatus in response to the apparatus having an error. In another embodiment, the apparatus includes a file module that encapsulates the failure information into a file. In a further embodiment, the apparatus includes a communications module that transmits the file from the apparatus to a remote device using a low level file transfer protocol.

In one embodiment, the apparatus includes a diagnostic module that receives a diagnostic file. In another embodiment, the diagnostic file is based on the file. In one embodiment, the diagnostic file includes instructions to correct the error. In a further embodiment, the instructions include instructions to disable a component of the apparatus. In one embodiment, the instructions include instructions to configure a basic input output system of the apparatus. In one embodiment, the low level file transfer protocol is bi-directional.

In one embodiment, the apparatus is a personal computer and the remote device is selected from the group consisting of a storage device, and a mobile device. In another embodiment, the file module encapsulates the file using object notation.

A method is disclosed for remote diagnostics. In one embodiment, the method includes collecting failure information from a computing device, wherein the computing device has an error. In another embodiment, the method includes encapsulating the failure information into a file. In a further embodiment, the method includes transmitting the file from the computing device to a remote device using a low level file transfer protocol.

In one embodiment, the method includes receiving a diagnostic file from the remote device. In another embodiment, the diagnostic file includes instructions to correct the error. In a further embodiment, the instructions are selected from the group consisting of instructions for a controller of the computing device, and instructions to a user of the computing device. In one embodiment, the instruction include instructions to a controller of the computing device to disable a component of the computing device. In another embodiment, the instructions include instructions to a controller of the computing device to reconfigure a basic input output system of the computing device.

In one embodiment, the method includes executing instructions in the diagnostic file to correct the error. In another embodiment, the computing device is a personal computer, and the remote device is selected from the group consisting of a storage device and a mobile device. In a further embodiment, the method includes uploading the file to a remote server, the remote server generating the diagnostic file. In one embodiment, a format of the file is based on object notation.

A program product is disclosed that includes a computer readable storage medium storing machine readable code executable by a processor. In one embodiment, the machine readable code includes collecting failure information from a computing device, wherein the computing device has an error. In another embodiment, the machine readable code includes encapsulating the failure information into a file. In a further embodiment, the machine readable code includes transmitting the file from the computing device to a remote device using a low level file transfer protocol.

In one embodiment, the machine readable code includes receiving a diagnostic file from the remote device. In a further embodiment, the low level file transfer protocol is bi-directional.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is an illustration depicting one example of object notation;

DETAILED DESCRIPTION

Figure 1:
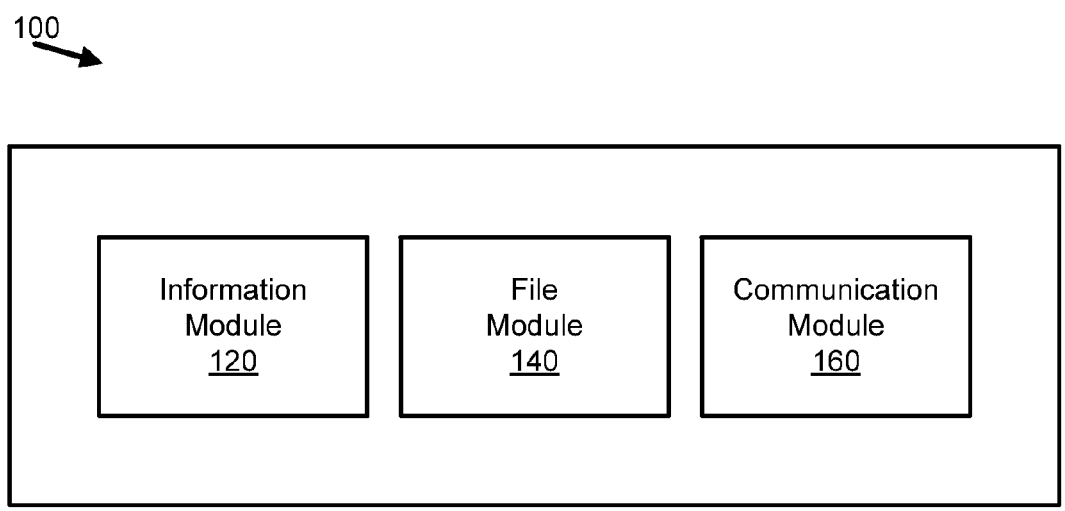
FIG. 1 is a schematic block diagram illustrating one embodiment of an apparatus for remote diagnostics.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

As used herein, a computing device at least means a device capable of performing logic operations. A computing device may include a process, memory, display, or the like. For example, a computing device, may be a server, a personal computer, a handheld computer, a mobile device, a cellular phone, a tablet computer, a laptop computer, or other, or the like.

In certain scenarios, a computing device may fail to boot, may experience another error, may be configured incorrectly, or the like. In one example, a basic input output system of the computing device may be configured to attempt to boot from a storage media that does not include an operating system. In another example, a basic input output system of the computing device may be configured to disable components that are required to boot, such as, but not limited to, storage, memory, video capabilities, or the like.

In one embodiment, a component of the computing device may fail, or perform inadequately. For example, a component of the computing device, such as storage media, memory, displays, communication components, or the like, may fail and not function. In one example, a power supply for the computing device may supply inadequate voltage levels for the computing device. This may cause many other components to fail or cease to function. In another example, a display component for the computing device may fail such that the computing device cannot display an error message to the user. Of course, one skilled in the art may recognize many other failure modes for a computing device, and this disclose in meant to include all such failures.

Components of a computing device may include any devices that operate as part of the computing device, or communicate with the computing device. Examples of various computing devices may include, processors, memory, storage, display, communication, input devices, output devices, other boards communicating via a bus, or the like.

FIG. 1 is a schematic block diagram illustrating one embodiment 100 of an apparatus for remote diagnostics. In one embodiment, the apparatus includes an information module 120, a file module 140, and a communication module 160.

In one embodiment, the information module 120 may be configured to collect failure information from the apparatus 100 in response to the apparatus having an error. In one example, the information module 120 may be a system-on-a-chip (SoC).

The information module 120 may be configured to collect information before a failure. In one example, the information module 120 may communicate with various components of the apparatus and may store information for each component. For example, the information module 120 may store a model and a make of a component. In another example, the information module 120 may store configuration settings for a component. In another example, the information module 120 may store resource usage for components of the apparatus, such as, but not limited to, address space usage, interrupt request usage, memory usage, or the like.

In another embodiment, the information module 120 may be configured to collect information during a failure. For example, the information module 120 may monitor various voltage levels for the apparatus, and in response to a voltage level falling below a threshold level, may begin collecting information about the apparatus although one or more components may not yet have failed.

In another embodiment, the information module 120 may be configured to collect information about the apparatus after a failure. For example, in response to the apparatus 100 failing to boot, the information module 120 may collect configuration settings for components of the apparatus. In another example, the information module 120 may collect a list of components of the computing device, or other information about the computing device as described herein. In another embodiment, the apparatus 100 may have booted, however a failure may be identified that may cause the apparatus to not boot if it were power cycled. For example, the information module 120 may detect a change in a BIOS configuration that may cause the apparatus 100 to not boot. Therefore, the failure condition is not limited to the apparatus not booting, as it may have been booted prior to the boot error.

In another embodiment, the information module 120 may collect and store any and all information related to a failure or a potential failure. This information at least includes, components, component makes, component models, resource usage, processors, memory, storage, buses, power supplies, voltages, currents, temperatures, displays, video cards, or other, or the like. Of course, one skilled in the art may recognize information that may be related to a failure and the information module 120 is meant to be capable of collecting all such information.

Collecting comprehensive failure information electronically may provide sufficient information for a remote technician to troubleshoot the boot failure. If the failure is repairable by the user, instruction may be provided in a diagnostic file as will be later discussed. If more technical repair is needed, the technician may be able to immediately diagnose the failure and may ensure that the failure cannot be fixed by the user before requesting return of the computing device for repair. This may reduce a return rate for computing devices that fail to boot for reasons that a user could likely correct.

In one embodiment, the file module 140 may be configured to encapsulate information from the information module 120 into a file. The file module 140 may receive the information from the information module 120, or the file module 140 may read the information stored in the information module 120. In another embodiment, the file module 140 may encapsulate information related to a specific component. For example, in response to inconsistent voltage levels, the file module 140 may encapsulate information related to the power supply.

Encapsulating information, as described herein, may include storing the information in a file. In one example, encapsulating the information may include storing the file in a human readable file format. In another example, encapsulating the information may include storing the information in a binary file. In another example, encapsulating the information may include storing the information In another embodiment, encapsulating the information into a file may include encoding the information into the file. For example, information related to specific components in the computing device may be encoded as integer values, or the like. Furthermore, error codes may be used to represent certain predefined errors and the error codes may be included in the file instead of a human readable description of the error. Encoding the file may make the file smaller.

In another embodiment, encapsulating the information into the file may include encrypting the information into the file. For example, after including the information into the file, the file module 140 may encrypt the file.

In one embodiment, the file may be stored as a binary file. In another embodiment, the file may be stored as a human readable file. For example, in response to an error in a memory chip, the file may include a human readable error message such as, "The memory in bank 1 has failed." In another example, in response to the error including an incorrect voltage level, a human readable message may be included in the file such as, "Inconsistent voltage levels detected," or the like.

In another embodiment, the file module 140 may encapsulate the information into a file using a tagged file format. For example, values representing properties of various components in the computing device may be enclosed using variables. For example, a value representing a property of a component may be enclosed using a beginning tag and an ending tag.

In another embodiment, the file module 140 may encapsulate the information into a file using a java script object notation format. For example, various properties of components of the computing device may be encapsulated into a collection of name/value pairs. Respective properties may be assigned a variable name and the variable name may be used to encapsulate the property in the file.

In one embodiment, the communication module 160 may be configured to transmit the file from the apparatus to a remote device using a low level file transfer protocol. A low level transfer protocol, as described herein, may include a transfer protocol without the assistance of an operating system. A low level transfer protocol may be used to transfer a file without using a device driver. For example, a low level transfer protocol may be operated by a controller without booting an operating system for the device. Therefore, in one embodiment, although an operating system for a computing device may not boot, the communication module 160 may communicate with a remote device using the low level file transfer protocol. Therefore, in certain embodiments, the communication module 160 may transfer a file to the remote device without assistance from an operating system. In one example, a chip or die may be configured to communicate to a remote device using the low level transfer protocol, and the communication module 160 may include the chip or die.

Furthermore, a low level transfer protocol may be implemented by an application, a driver, operating system module, or the like. Therefore, a computing device may communicate using the low level transfer protocol using an application executing on the computing device.

In one example, a user may attach a universal serial bus (USB) storage device to the computing device and the communication module 160 may write the file to the storage device. In another example, a user may attach a mobile device to the computing device, and the communication module 160 may transfer the file to the mobile device. In another example, in response to the computing device not booting, a user may attach a USB hard drive to the computing device and the communication module 160 may transfer the file to the USB hard drive using the low level transfer protocol.

In another embodiment, a user may attach a smart phone configured to execute an application that is capable of communicating via the low level transfer protocol. In response to the computing device not booting and a user connecting the smart phone and executing an application to communicate using the low level transfer protocol, the communication module 160 may transfer the file to the smart phone.

In one embodiment, the low level transfer protocol may include a media transfer protocol (MTP). The MTP may allow the transfer of a file using a transfer function. The transfer function may copy a file to a remote computing device as one skilled in the art may appreciate. The MTP transfer function may be implemented using a system on a chip, a controller, or other low level device.

In another embodiment, the low level transfer protocol may include a USB mass storage protocol. The USB mass storage protocol may enable the communication module 160 to transfer the file to a remote computing device. In one example, the remote computing device may appear to be an external hard drive. In one embodiment, the low level transfer protocol may be defined by the USB Implementers forum that runs on a USB connection.

In another embodiment, the low level transfer protocol may include an iDevice protocol. Therefore, in one embodiment, the communication module 160 may communicate with an Apple™ device using an iDevice protocol. Therefore, in one embodiment, the communication module 160 may transfer the file to an Apple™ device using an iDevice protocol.

Figure 2:
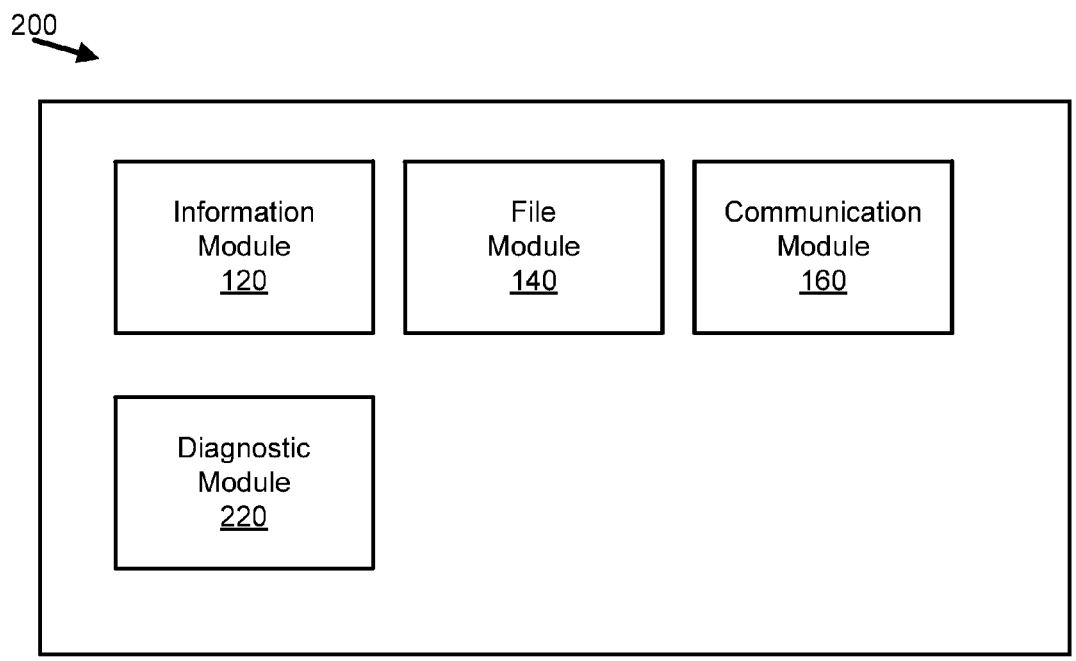
FIG. 2 is a schematic block diagram illustrating one embodiment of an apparatus for remote diagnostics.

FIG. 2 is a schematic block diagram illustrating one embodiment 200 of an apparatus for remote diagnostics. In one embodiment, the apparatus 200 includes the information module 120, the file module 140, the communication module 160, and a diagnostic module 220. The information module 120, the file module 140, and the communication module 160 may or may not be substantially similar to similar modules depicted in FIG. 1.

In one embodiment, the apparatus 200 includes the diagnostic module 220 configured to receive a diagnostic file. In one embodiment, the diagnostic file may be based on the information file. In one embodiment, the diagnostic module 220 may receive the diagnostic file using a similar protocol as the communication module 160. Therefore, in one embodiment, the low level transfer protocol is bi-directional. A remote computing device may use a transfer command of the low level transfer protocol to transfer the diagnostic file to the diagnostic module 220.

In another embodiment, the diagnostic file may be similarly formatted as the information file. The diagnostic file may be encoded, encrypted, compressed, or the like. The diagnostic module 220 may read the encapsulation format of the diagnostic file. In one example, the diagnostic file may be formatted similar to the information file format. For example, the diagnostic file may be encapsulated in a java script object notation and the diagnostic module 220 may read the object notation of the diagnostic file.

In one embodiment, the diagnostic file may include instructions to correct one or more errors of the computing device. In one example, the computing device may not boot because a basic input output system for the computing device may be incorrectly configured. Therefore, in one example, the diagnostic file may include configuration parameters for the basic input output system. The diagnostic module 220 may reconfigure the basic input output system based on the configuration parameters in the diagnostic file to correct the error. In another example, the diagnostic file may include instructions to return the BIOS to a previous configuration.

In another example, the diagnostic file may include instruction to disable a component of the computing device. For example, where the computing device may not boot because of a computing device interfering with a necessary component, such as storage, display, or the like, the instruction in the diagnostic file may include an instruction to disable the interfering component. This may result in the correcting the error for the computing device. In certain examples, failures may include hardware peripheral devices, hardware components, inconsistent voltages, BIOS settings, power failures, fan failures, temperatures, or the like.

In another embodiment, the diagnostic file may include instructions to a user of the computing device. Instruction to a user of the computing device may include connecting or disconnecting components, reconfiguring a BIOS for the computing device, inserting bootable storage media, or the like.

In another embodiment, the diagnostic file may include instruction that partially correct the failure. Partial functionality may include correcting an error with storage media to facilitate copying files on a storage device to the remote computing device.

In a further embodiment, the diagnostic file may include an identification of the failure. For example, the diagnostic file may identify a hardware component that has failed. In another embodiment, the diagnostic file may include an identification of potential causes of the failure. For example, an altered BIOS setting may be identified as a cause of the failure. In another embodiment, the diagnostic file may include potential solutions to the failure. In one example, the diagnostic file may include alterations to BIOS settings for the computing device. In another embodiment, the diagnostic file may include step by step procedures for a user to correct the failure. For example, where the failure is a failing hardware peripheral, the step by step procedures may include steps necessary to remove the failing hardware peripheral from the computing device.

Figure 3:
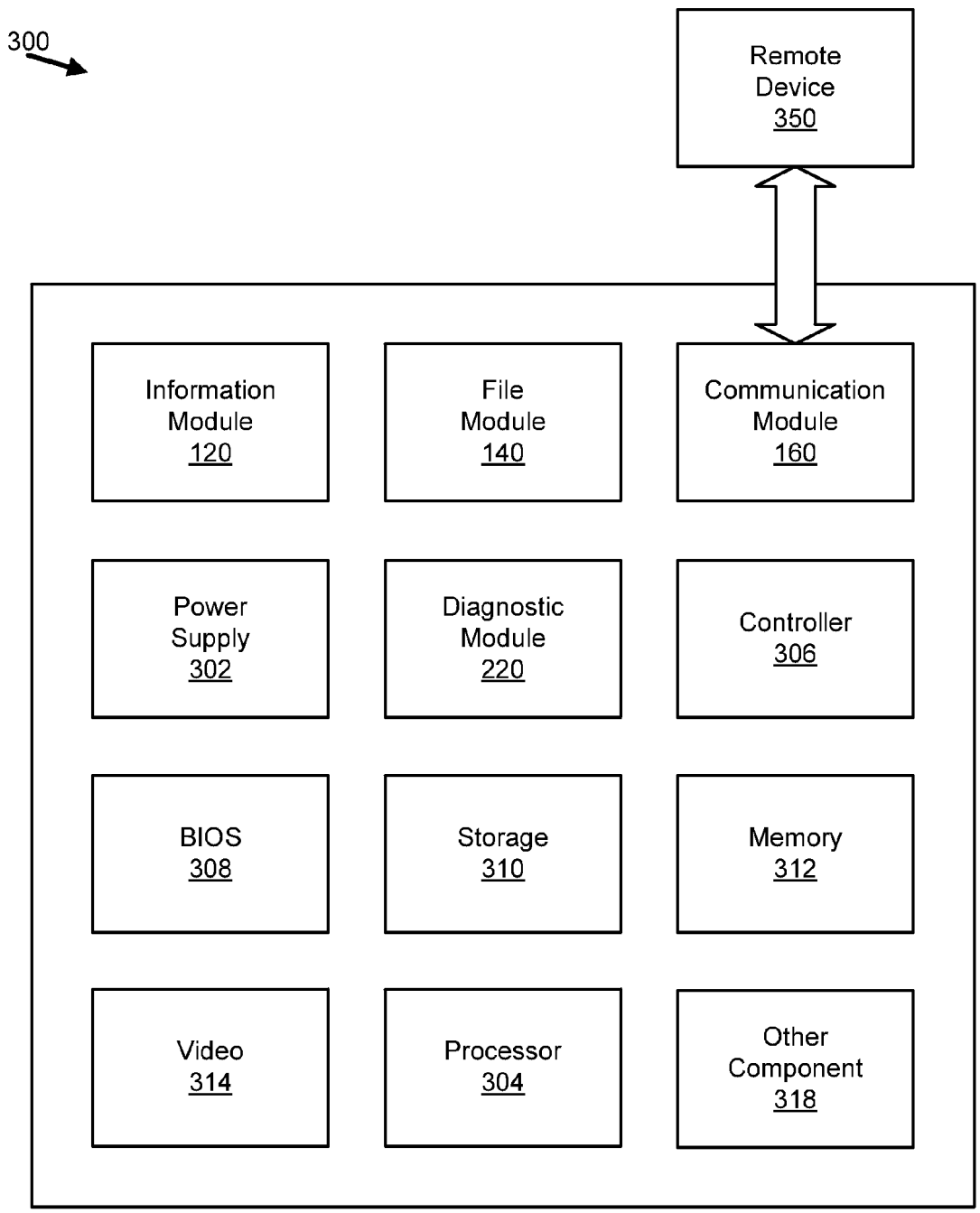
FIG. 3 is a schematic block diagram illustrating one embodiment of an apparatus for remote diagnostics.

FIG. 3 is a schematic block diagram illustrating one embodiment of an apparatus for remote diagnostics. In one embodiment, the apparatus 300 may include the information module 120, the file module 140, the communication module 160, a diagnostic module 220, a power supply 302, a controller 306, a BIOS 308, storage 310, memory 312, video 314, a processor 304, and an other component 318. The information module 120, the file module 140, the communication module 160, and the diagnostic module 220 may or may not be substantially similar to similar modules depicted in FIG. 2.

In one embodiment, the power supply 302 may include a wide variety of power supplies as one skilled in the art may appreciate and the information module 120 may collect information regarding the power supply 302. In another embodiment, the controller may manage input and/or output as one skilled in the art may appreciate and the information module 120 may collect information regarding the controller 306. In a further embodiment, the BIOS 308 may include a wide variety of basic input output systems as one skilled in the art may appreciate and the information module 120 may collect and/or store information regarding the BIOS 308. Furthermore, the diagnostic module 220 may modify settings in the BIOS 308 based on instructions received in a diagnostic file.

In another embodiment, the storage 310 may include a wide variety of storage technologies as one skilled in the art may appreciate and the information module 120 may collect information regarding the storage 310. For example, the storage 310 may store an operating system for the computing device and the information module 120 may track a location of the operating system on the storage device 310. In one embodiment, the memory 312 may include a wide variety of memory technologies including, but not limited to, volatile memory, non-volatile memory, phase change memory, or other, or the like as one skilled in the art may appreciate and the information module 120 may store information regarding the memory 312.

In another embodiment, the video 314 may include a wide variety of different display hardware. Display hardware may generate a display signal for transmission to a display device as one skilled in the art may appreciate and this disclosure is not limited in this regard. The information module 120 may store information regarding the video 314. In a further embodiment, the processor 304 may include a wide variety of processors as one skilled in the art may appreciate and this disclosure is not limited in this regard. The information module 120 may store information regarding the processor 304. In another embodiment, the other component may be a wide variety of other components that may be included in a computing device as one skilled in the art may appreciate. In certain examples, the other component may be audio hardware, network hardware, serial bus hardware, peripheral hardware, gaming hardware, communication hardware, processing hardware, display hardware, or other, or the like. The information module 120 may store any and all information regarding the other component 318.

In another embodiment, the communication module 160 may communicate with a remote device 350 and may transmit a information file to the remote device 350 as described herein.

FIG. 4 is an illustration depicting one example 400 of object notation. Object notation may include a wide variety of different formats, organizations, structures, or the like as one skilled in the art may appreciate. In one example 400, the information file may include an object encapsulated in brackets 402,406. Within the object, the file may include data fields 404 such as display, memory, storage, and/or a processor. In one example, the processor may include subfields, such as, but not limited to, a processor make, a processor model, a processor temperature, a processor number of cores, or the like. The processor subfields may also be delineated using brackets.

In one example, the object 402 may include many sub-objects 440. In this example, a sub-object 440 may be labeled peripherals and my include information regarding peripherals of the computing device. The sub-object 440 may use brackets 444 (T) to indicate that the object is a list of objects. In this example, the information file may be human readable. Therefore, in some embodiments, a user of the computing device may read the information file without knowledge of an encoding scheme, or the like.

In one embodiment, the file module 140 may encapsulate the information into a file using a similar object notation. In another embodiment, the file module 140 may encapsulate the information using a java script object notation. In another embodiment, the format of the information file may be customized and may not conform to any established standard format.

Figure 5:
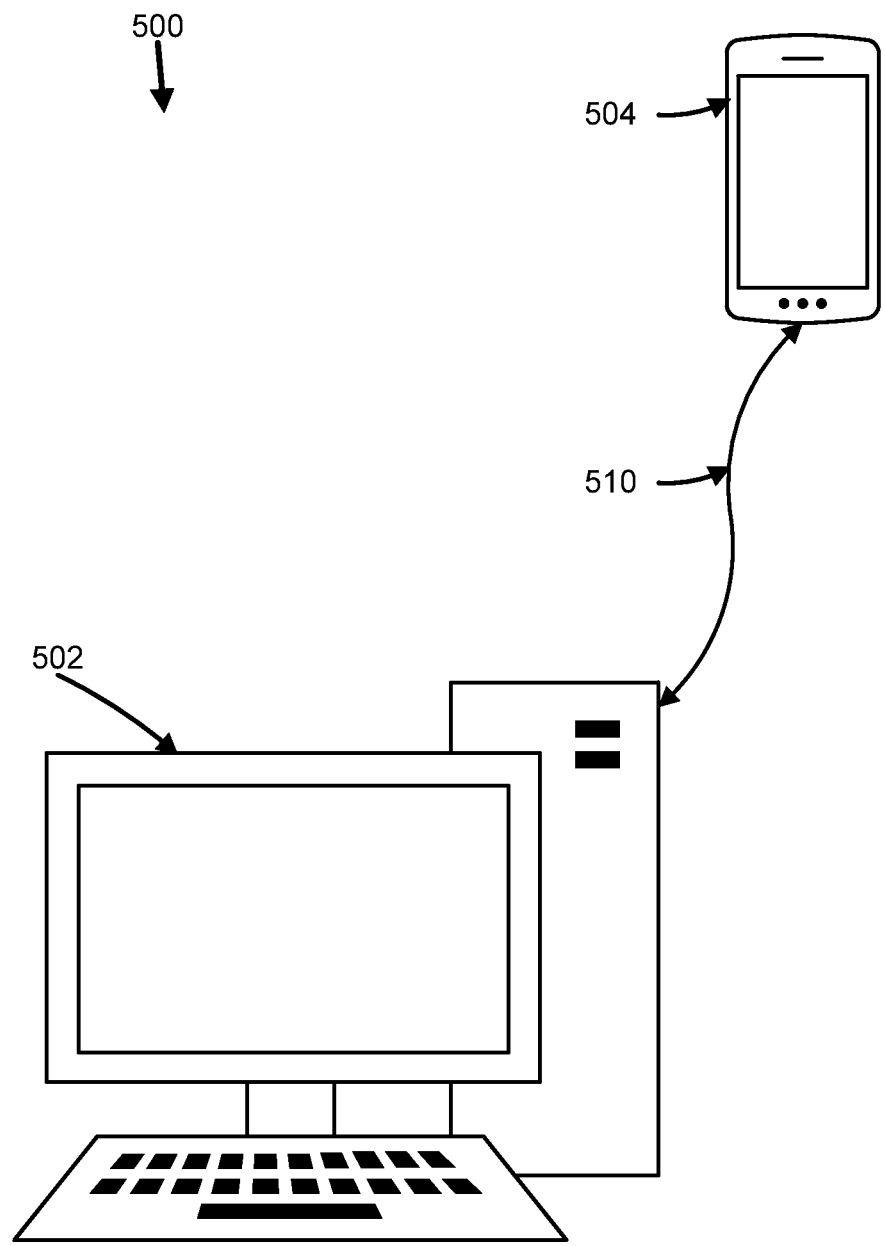
FIG. 5 is an illustration depicting one embodiment of a system for remote diagnostics communicating with a remote device.

FIG. 5 is an illustration depicting one embodiment 500 of a system for remote diagnostics communicating with a remote device 504. In one embodiment, an apparatus for remote boot diagnostics is a personal computer 502. The personal computer may be a computing device that is intended for use at a single or regular location. In another embodiment, the remote computing device 504 may be a smart phone that is capable of executing applications.

In one embodiment, in response to the computing device 502 not booting, a user may connect the smart phone 504 to the computing device. In one embodiment, the connection between the computing device 502 and the smart phone 504 may be a wired connection, wherein the communication module 160 and an application executing on the smart phone 504 may communicate. This may allow the communication module 160 to transfer a failure information file to the smart phone 504.

In one embodiment, the application on the smart phone 504 may process the boot failure information file and display instruction to the user to correct the boot failure. In another embodiment, the application on the smart phone 504 may generate instructions to correct the boot failure. The instruction may be included in diagnostic file and transmitted to the diagnostic module 220 executing on the computing device 502. The diagnostic module 220 may execute the instructions in the diagnostic file to correct the boot failure.

In another embodiment, a user may insert a flash based storage device and the communication module 160 may transmit a file to the flash based storage device. The user may upload the received file to a remote web server to analyze the boot failure information. In one embodiment, the web server may generate human readable instructions to the user to correct the boot error. In another embodiment, the remote web server may generate computer readable instructions to correct the boot failure and transmit the instructions in a diagnostic file to the user. The user may then copy the diagnostic file to the flash based storage device and attach the flash based storage device to the computing device 502. The diagnostic module 220 may copy the file from the flash based storage device and execute the instructions in the diagnostic file to correct the boot failure.

Figure 6:
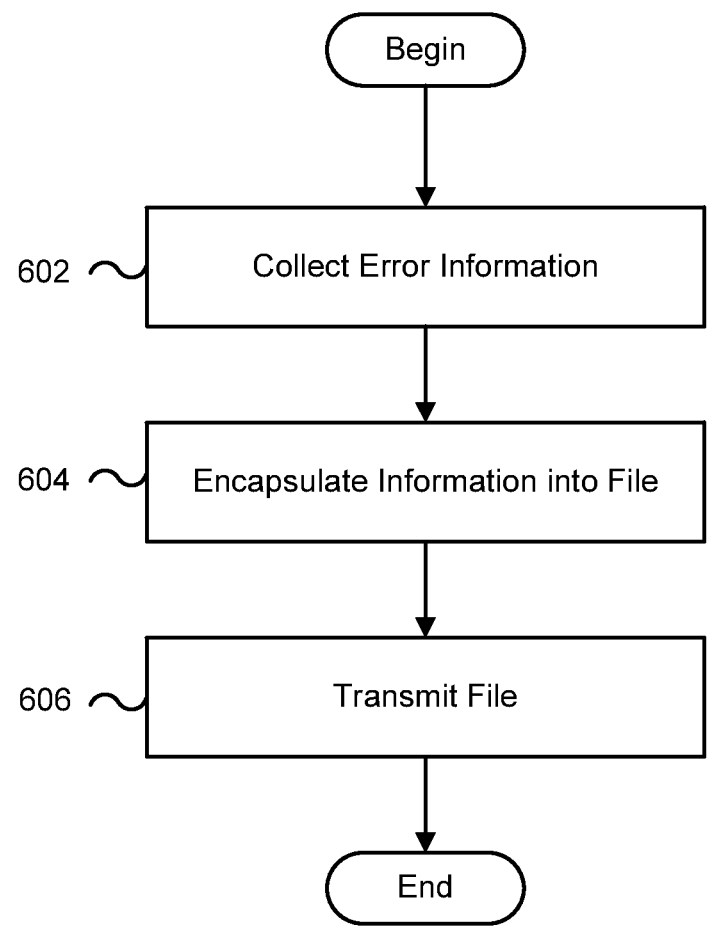
FIG. 6 is a schematic flow chart diagram illustrating one embodiment of a method for remote diagnostics.

FIG. 6 is a schematic flow chart diagram illustrating one embodiment of a method 600 for remote diagnostics. In one embodiment, the method may begin and an information module 120 may collect 602 failure information from a computing device that has a boot error. The file module 140 may encapsulate 604 the failure information into a file. The communication module 160 may transmit 606 the file from the computing device to a remote device using a low level file transfer protocol.

Figure 7:
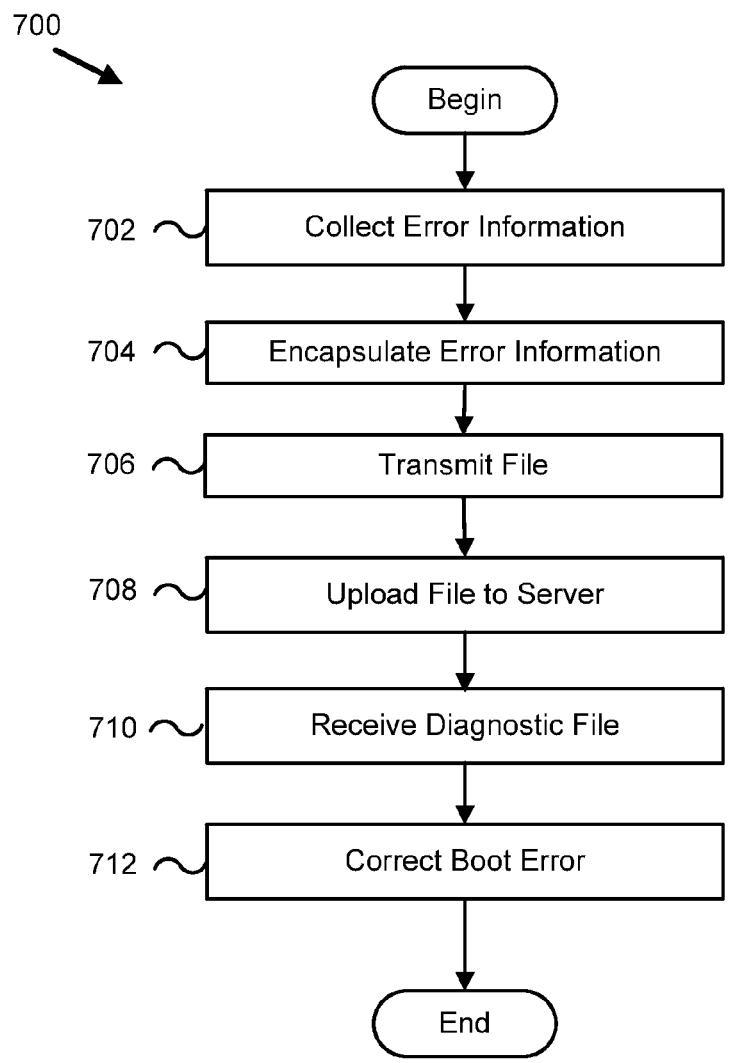
FIG. 7 is a schematic flow chart diagram illustrating another embodiment of a remote diagnostics method.

FIG. 7 is a schematic flow chart diagram illustrating another embodiment of a remote diagnostics method. In one embodiment, the method 700 may begin and an information module 120 may collect 702 failure information from a computing device that has an error. The file module 140 may encapsulate 704 the failure information into a file. The communication module 160 may transmit 706 the file from the computing device to a remote device using a low level file transfer protocol. A user may upload 708 the file to a remote server. The diagnostic module 220 may receive 710 a diagnostic file. The diagnostic module 220 may correct 712 the error based on instructions in the diagnostic file and the method may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   collect failure information in response to an error at a computing device;
   encapsulate the failure information into an information file, the failure information relating to the error;
   transmit the information file to a remote device using a low level file transfer protocol; and receive a diagnostic file from the remote device, the diagnostic file being generated by the remote device in response to the information file, wherein the diagnostic file comprises instructions to correct the error at the computing device, wherein the instructions to correct the error are selected from the group consisting of: configuration parameters to correct the error, human readable instructions for correcting the error, and computer readable instructions for correcting the error.

2. The application of claim 1, wherein the error comprises a boot error and the processor transmits the information file without assistance from an operating system.

3. The apparatus of claim 1, wherein the instructions to correct the error at the computing device comprise instructions to disable a component.

4. The apparatus of claim 1, wherein the diagnostic file contains configuration parameters for correcting the error and wherein the processor further reconfigures the computing device based on the configuration parameters in the diagnostic file.

5. The apparatus of claim 1, wherein the low level file transfer protocol is selected from the group consisting of a media transfer protocol and a universal serial bus mass storage protocol.

6. The apparatus of claim 1, wherein the apparatus is a personal computer, and the remote device is selected from the group consisting of a storage device, and a mobile device.

7. The apparatus of claim 1, wherein the file module encapsulates the information file using object notation.

8. The apparatus of claim 1, wherein the instructions to correct the error at the computing device comprises computer-readable instructions and wherein the memory further comprises code executable by the processor to execute the computer-readable instructions in the diagnostic file to correct the error.

9. The apparatus of claim 1, wherein the diagnostic file contains human readable instructions for correcting the error, and wherein the processor further displays the human readable instructions.

10. A method comprising:
   collecting, by use of a processor, failure information from a computing device, wherein the computing device has an error;
   encapsulating the failure information into an information file, the failure information relating to the error;
   transmitting the information file from the computing device to a remote device using a low level file transfer protocol; and
   receiving a diagnostic file from the remote device, the diagnostic file being generated by the remote device in response to the information file, wherein the diagnostic file comprises instructions to correct the error at the computing device, wherein the instructions to correct the error are selected from the group consisting of: configuration parameters to correct the error, human readable instructions for correcting the error, and computer readable instructions for correcting the error.

11. The method of claim 10, wherein the error comprises a boot error and transmitting comprises transmitting the information file without assistance from an operating system.

12. The method of claim 10, wherein the instructions to correct the error at the computing device comprise instructions to a controller of the computing device to disable a component of the computing device.

13. The method of claim 10, wherein the instructions to correct the error at the computing device comprise instructions to a controller of the computing device to reconfigure a basic input output system of the computing device.

14. The method of claim 10, further comprising executing instructions in the diagnostic file to correct the error.

15. The method of claim 10, wherein the computing device is a personal computer, and the remote device is selected from the group consisting of a storage device and a mobile device.

16. The method of claim 10, further comprising uploading the information file to a remote server, the remote server generating the diagnostic file.

17. The method of claim 10, wherein a format of the information file is based on object notation.

18. A computer program product comprising a non-transitory computer readable storage medium that stores code executable by a processor to perform:
   collecting failure information from a computing device, wherein the computing device has an error;
   encapsulating the failure information into an information file, the failure information relating to the error;
   transmitting the information file from the computing device to a remote device using a low level file transfer protocol; and
   receiving a diagnostic file from the remote device, the diagnostic file being generated by the remote device in response to the information file, wherein the diagnostic file comprises instructions to correct the error at the computing device, wherein the instructions to correct the error are selected from the group consisting of: configuration parameters to correct the error, human readable instructions for correcting the error, and computer readable instructions for correcting the error.

19. The computer program product of claim 18, wherein the low level file transfer protocol is selected from the group consisting of a media transfer protocol and a universal serial bus mass storage protocol.

20. The computer program product of claim 18, wherein the instructions to correct the error at the computing device comprises computer-readable instructions, the code further to perform: executing the computer-readable instructions in the diagnostic file to correct the error.

* * * * *